(12) United States Patent
Kang

(10) Patent No.: US 11,256,355 B2
(45) Date of Patent: Feb. 22, 2022

(54) TOUCH DISPLAY DEVICE AND DISPLAY PANEL

(71) Applicant: LG Display Co., Ltd., Seoul (KR)

(72) Inventor: SungGu Kang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/932,393

(22) Filed: Jul. 17, 2020

(65) Prior Publication Data

US 2021/0117029 A1     Apr. 22, 2021

(30) Foreign Application Priority Data

Oct. 16, 2019  (KR) .......................... 10-2019-0128495

(51) Int. Cl.
  *G06F 3/041*      (2006.01)
  *G09G 3/20*       (2006.01)
  *G06F 3/044*      (2006.01)

(52) U.S. Cl.
  CPC ............. *G06F 3/0412* (2013.01); *G09G 3/20* (2013.01); *G06F 3/044* (2013.01); *G06F 3/0416* (2013.01); *G09G 2310/0267* (2013.01); *G09G 2310/0275* (2013.01); *G09G 2320/0233* (2013.01)

(58) Field of Classification Search
  CPC ........ G06F 3/0412; G06F 3/20; G06F 3/0416; G06F 3/044; G09G 2310/0267; G09G 2310/0275; G09G 2320/0233
  See application file for complete search history.

(56) References Cited

U.S. PATENT DOCUMENTS

2019/0146621 A1*  5/2019  Aoki ..................... G06F 3/0412
                                                             345/174
2019/0302557 A1* 10/2019  Obinata .............. G02F 1/13338

\* cited by examiner

*Primary Examiner* — Peter D McLoone
(74) *Attorney, Agent, or Firm* — Fenwick & West LLP

(57) ABSTRACT

Embodiments of the disclosure relate to a touch display device and display panel, and more specifically, to a touch display device and display panel, in which the poor brightness issue may be addressed by evenly arranging the touch lines and contact holes in the touch electrodes positioned in the outer edge of the touch display panel.

20 Claims, 14 Drawing Sheets

TOUCH DISPLAY DEVICE AND DISPLAY PANEL

CROSS-REFERENCE TO RELATED APPLICATION

This application claims priority from Republic of Korea Patent Application No. 10-2019-0128495, filed on Oct. 16, 2019, which is hereby incorporated by reference in its entirety.

FIELD

Embodiments of the disclosure relate to a touch display device and display panel.

BACKGROUND

Display devices used in computer monitors or TVs include self-emissive display devices, such as organic light emitting display (OLED), vacuum fluorescent display (VFD), field emission display (FED), and plasma display panel (PDP), and non-self emissive displays requiring a light source, such as liquid crystal display (LCD).

LCD includes two substrates with electric field generation electrodes and a liquid crystal layer with dielectric anisotropy between the two substrates. A voltage applied to the electric field generation electrode generates an electric field across the liquid crystal layer, and the strength of the electric field is adjusted by varying the voltage. The adjustment of the strength of the electric field adjusts the transmittance of light passing through the liquid crystal layer, displaying a desired image.

An LCD includes a data driving circuit, a gate driving circuit, and a backlight unit. The data driving circuit receives image data from an external source, generates data voltages, and supplies the data voltages through the data lines to the pixels. The gate driving circuit generates and supplies gate signals to the pixels to drive the pixels line by line. The backlight unit is placed on the back of the display panel to provide light.

Light emitting diode (LED) are recently being adopted as a light source, with the features of high optical efficiency, compact size, and low power consumption.

For a touch input in the display device, in-cell type touch display devices including touch screen components in their display panel of the touch display device is developed and used to manufacture slim portable devices, such as smartphones or tablet PCs.

Such a touch display device uses common electrodes for driving the pixels as electrodes for sensing a touch. The common voltage VCOM is supplied to the thin film transistors during display period and, a touch driving signal TDS is provided to the common electrode operating as a touch electrode during touch period.

Compact touch display devices like smartphones have a rectangular display screen, and their display panel is rectangular in shape.

Use of touch display devices in various industry sectors, such as of watches or dashboards, led to demand for non-squared, e.g., circular, display screens, and display panels are also being non-squared.

Since the circular touch display devices have a curved portion along the edge area of the display panel, poor brightness may be induced in the adjacent area due to non-uniform arrangement of touch lines for touch electrodes positioned in the edge area.

SUMMARY

According to various embodiments of the disclosure, there may be provided a touch display device and display panel, in which the poor brightness issue may be solved by arranging the touch lines and contact holes in the touch electrodes positioned in the outer portion of the touch display panel.

According to various embodiments of the disclosure, there may be provided a touch display device and display panel, in which the poor brightness issue may be solved by integrating some touch electrodes in the outer portion of the touch display panel.

According to an embodiment, a touch display device comprises a display panel having a non-squared structure and including a plurality of subpixels displaying an image and a plurality of touch electrodes performing touch sensing, a gate driving circuit driving a plurality of gate lines connected with the plurality of subpixels, a data driving circuit driving a plurality of data lines connected with the plurality of subpixels, and a touch circuit driving a plurality of touch lines connected with the touch electrodes, wherein the display panel includes an outer touch electrode area having at least one or more non-squared touch electrodes, in which at least one or more of an outermost contact holes are arranged on an outermost touch line and a plurality of contact holes are uniformly or symmetrically arranged from the outermost contact holes to a middle of the display panel, and a middle touch electrode area.

According to an embodiment, the display panel may include at least one or more of a circular display panel, a chamfered display panel, a notched display panel, and a trapezoidal display panel.

According to an embodiment, the outer touch electrode area may include one or more outermost rows of touch electrodes along a direction parallel with the touch lines.

According to an embodiment, the outermost contact hole may be disposed at an outermost portion of a touch electrode positioned in a middle of the outer touch electrode area.

According to an embodiment, in the outer touch electrode area, the plurality of contact holes may be alternately arranged in an upper direction or lower direction from the outermost contact hole to the middle of the display panel.

According to an embodiment, the number of touch lines arranged in the outer touch electrode area may be identical to the number of touch electrodes arranged in the outer touch electrode area.

According to an embodiment, the outer touch electrode area may include, in addition to the touch lines, dummy touch lines to have the same number of touch electrodes arranged in a first row of the middle touch electrode area.

According to an embodiment, the dummy touch lines may be arranged densely at a side of the outer touch electrode area.

According to an embodiment, the dummy touch lines may be uniformly arranged between the touch lines in the outer touch electrode area.

According to an embodiment, in a left portion of the middle touch electrode area, contact holes may be arranged in the same pattern as the outer touch electrode area which is positioned on a left side of the middle touch electrode area.

According to an embodiment, in a left portion of the middle touch electrode area, the outermost contact hole may be disposed in a middle-left touch electrode, and the contact holes are alternately arranged in a right-upper direction and a right-lower direction.

According to an embodiment, in a right portion of the middle touch electrode area, contact holes may be arranged in the same pattern as the outer touch electrode area which is positioned on a right side of the middle touch electrode area.

According to an embodiment, in a right portion of the middle touch electrode area, the outermost contact hole may be disposed in a middle-right touch electrode, and the contact holes are alternately arranged in a left-upper direction or a left-lower direction.

According to an embodiment, a touch electrode incapable of having a contact hole formed in the outer touch electrode area may be electrically connected with an adjacent touch electrode having a contact hole formed in the same sensing area with a predetermined size.

According to an embodiment, a display panel having a non-squared structure comprising a plurality of subpixels displaying an image and a plurality of touch electrodes performing touch sensing includes an outer touch electrode area having at least one or more non-squared touch electrodes, in which at least one or more of an outermost contact hole are arranged on an outermost touch line and a plurality of contact holes are uniformly or symmetrically arranged from the outermost contact hole to a middle of the display panel, and a middle touch electrode area.

According to various embodiments of the disclosure, there may be provided a touch display device and display panel, in which the poor brightness issue may be solved by uniformly arranging the touch lines and contact holes in the touch electrodes positioned in the outer edge of the touch display panel.

According to various embodiments of the disclosure, there may be provided a touch display device and display panel, in which the poor brightness issue may be solved by integrating some touch electrodes in the edge of the touch display panel.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
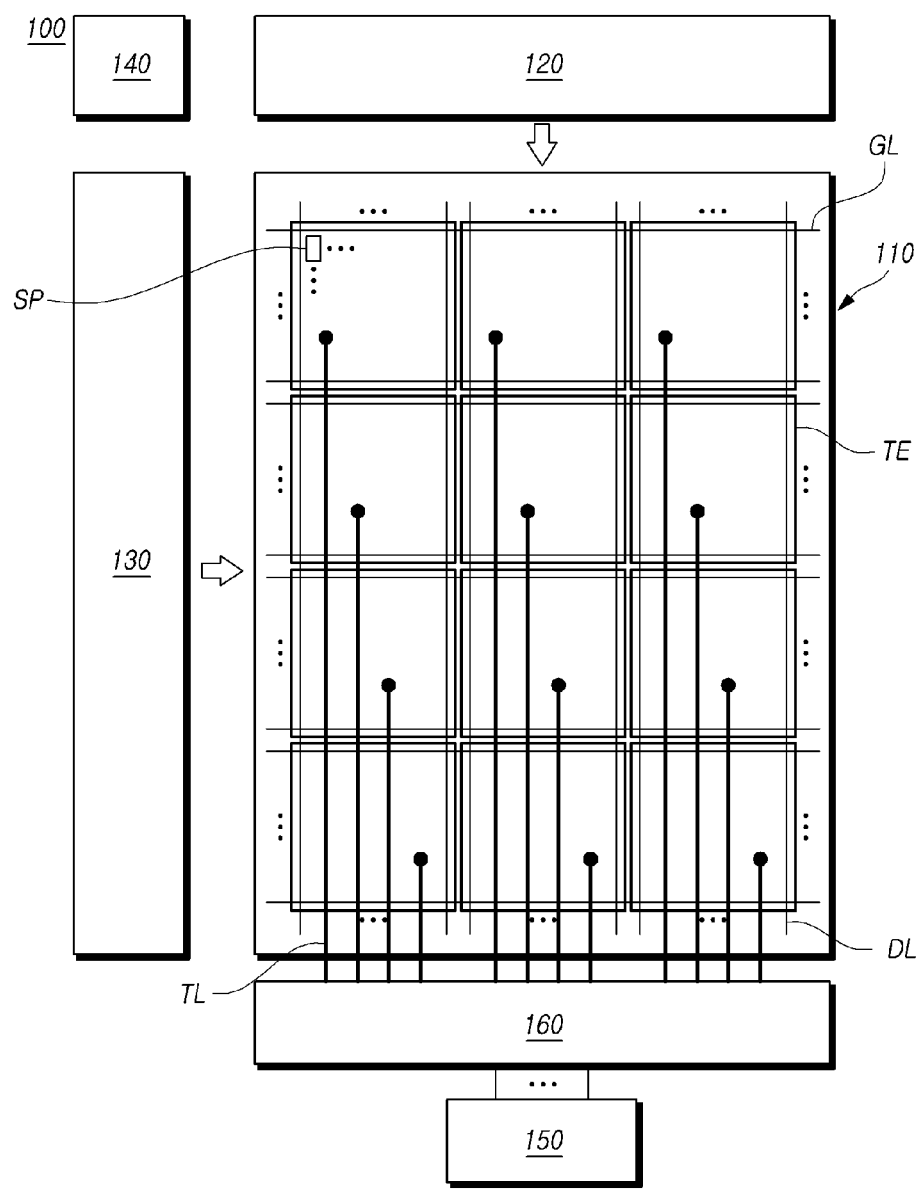
FIG. 1 is a view illustrating a configuration of a system of a touch display device according to one embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a view illustrating a configuration of a system of a touch display device.

Referring to FIG. 1, a touch display device 100 may have functions to display images and to sense touch.

The touch display device 100 may be a medium- or large-size device, e.g., a TV or monitor, or a mobile device, e.g., a smartphone or tablet PC, with the capability of sensing touch inputs.

To provide the display function, the touch display device 100 includes a display panel 110, a data driving circuit 120, a gate driving circuit 130, and a timing controller 140.

The display panel 110 may include a plurality of data lines DL arranged in a first direction (e.g., a column direction) and a plurality of gate lines GL arranged in a second direction (e.g., a row direction).

The data driving circuit 120 drives the plurality of data lines DL, and the gate driving circuit 130 drives the plurality of gate lines GL.

The timing controller 140 controls the data driving circuit 120 and the gate driving circuit 130 and, to that end, supplies various control signals to the data driving circuit 120 and the gate driving circuit 130.

The timing controller 140 starts scanning according to the timings in each frame, converts image data input from the outside to fit into the data signal format used in the data driving circuit 120, outputs the converted image data, and controls data driving at proper times according to scanning.

The timing controller 140 may be a controller used in the typical field of display or a control device including other control functions in addition to those of such a controller.

The data driving circuit 120 supplies a data voltage to the plurality of data lines DL, driving the plurality of data lines DL. The data driving circuit 120 is also referred to as a 'source driving circuit.'

The gate driving circuit 130 sequentially supplies scan signals to the plurality of gate lines GL, sequentially driving the plurality of gate lines GL. The gate driving circuit 130 is also referred to as a "scan driving circuit."

The gate driving circuit 130 sequentially supplies scan signals of on voltage or off voltage to the plurality of gate lines GL under the control of the timing controller 140.

When a specific gate line is opened by the gate driving circuit 130, the data driving circuit 120 converts the image data received from the timing controller 140 into an analog data voltage and supplies the analog data voltage to the plurality of data lines DL.

The data driving circuit 120 may be positioned on only one side (e.g., the top or bottom side) of the display panel 110 and, depending on driving schemes or panel designs, be positioned on each of two opposite sides (e.g., both the top and bottom sides) of the display panel 110.

The gate driving circuit 130 may be positioned on only one side (e.g., the left or right side) of the display panel 110 and, depending on driving schemes or panel designs, be positioned on each of two opposite sides (e.g., both the left and right sides) of the display panel 110.

The timing controller 140 receives, from the outside (e.g., a host system), various timing signals including a vertical synchronization signal Vsync, a horizontal synchronization signal Hsync, a data enable signal DE, and a clock signal CLK, along with the input image data.

The timing controller 140 converts the image data input from the outside to fit into the data signal format used in the data driving circuit 120 and outputs the converted image data. Further, to control the data driving circuit 120 and the gate driving circuit 130, the timing controller 140 receives the timing signals including the vertical sync signal Vsync, the horizontal sync signal Hsync, data enable signal DE, and clock signal CLK, generates various control signals, and transfers the control signals to the data driving circuit 120 and the gate driving circuit 130.

As an example, to control the gate driving circuit 130, the timing controller 140 outputs various gate control signals GCS including a gate start pulse GSP, a gate shift clock GSC, and a gate output enable signal GOE.

The gate start pulse GSP controls the start timing of one or more gate driver integrated circuits constituting the gate driving circuit 130. The gate shift clock GSC is a clock signal commonly input to one or more gate driver integrated circuits and controls the shift timing of the scan signals (gate pulses). The gate output enable signal GOE designates timing information about one or more gate driver integrated circuits.

To control the data driving circuit 120, the timing controller 140 outputs various data control signals DCS including, e.g., a source start pulse SSP, a source sampling clock SSC, and a source output enable signal SOE.

The source start pulse SSP controls the data sampling start timing of one or more data driver integrated circuits constituting the data driving circuit 120. The source sampling clock SSC is a clock signal for controlling the sampling timing of data in each driver integrated circuit. The source output enable signal SOE controls the output timing of the data driving circuit 120.

The data driving circuit 120 may include at least one data driver integrated circuit to drive the plurality of data lines.

Each data driver integrated circuit may be connected to the bonding pad of the display panel 110 in a tape automated bonding (TAB) or chip-on-glass (COG) scheme or may be directly disposed on the display panel 110 or, in some cases, may be integrated in the display panel 110.

Each data driver integrated circuit may also be implemented in a chip-on-film (COF) scheme to be mounted on a film connected to the display panel 110.

Each data driver integrated circuit may include a shift register, a latch circuit, a digital-to-analog converter (DAC), and an output buffer.

The gate driving circuit 130 may include at least one gate driver integrated circuit.

Each gate driver integrated circuit may be connected to the bonding pad of the display panel 110 in a tape automated bonding (TAB) or chip-on-glass (COG) scheme or may be implemented in a gate-in-panel (GIP) type to be directly disposed on the display panel 110 or, in some cases, may be integrated in the display panel 110. Each gate driver integrated circuit may also be implemented in a chip-on-film (COF) scheme to be mounted on a film connected to the display panel 110.

The touch display device 100 may be one of various types of devices, such as liquid crystal display devices, organic light emitting display devices, or plasma display devices.

Each subpixel SP disposed on the display panel 110 may include a circuit element, e.g., a transistor.

Meanwhile, the touch display device 100 may include a touch system for providing the touch sensing function.

The touch system may include a plurality of touch electrodes TE arranged in a matrix pattern to serve as touch sensors and a touch circuit 150 that drives the plurality of touch electrodes TE and senses a touch. The touch circuit 150 may include several modules (e.g., a touch driving circuit or touch sensing circuit) all or some of which may be included in the data driver integrated circuit of the data driving circuit 120 or may, along with the data driving circuit, constitute a separate integrated circuit.

The touch circuit 150 may sequentially supply touch driving signals to the plurality of touch electrodes TE, sequentially driving the plurality of touch electrodes TE.

Thereafter, the touch circuit 150 receives touch sensing signals from the touch electrodes TE to which the touch driving signals have been applied.

The touch circuit 150 may calculate the presence or absence of a touch, and if so, the coordinates of the touch, based on the touch sensing signals received from the plurality of touch electrodes TE.

As an example, the touch driving signal may have a pulse modulation signal waveform with two or more voltage levels.

The touch sensing signals received from the plurality of touch electrodes TE may be varied depending on the presence or absence of a touch by a pointer, such as a finger or pen, around the touch electrode TE.

The touch circuit 150 may figure out, e.g., the variation in capacitance (or variation in voltage or electric charge) at the touch electrode TE based on the touch sensing signal, obtaining the presence of a touch or the coordinates of the touch.

At this time, to supply touch driving signals to the plurality of touch electrodes TE, a touch line TL is connected to each touch electrode TE.

To sequentially supply touch driving signals to the plurality of touch electrodes TE, the touch system may further include a switch circuit 160 that sequentially connects the touch lines TL individually connected with the plurality of touch electrodes TE to the touch circuit 150.

The switch circuit 160 may include at least one multiplexer.

Each of the plurality of touch electrodes TE may be shaped as a block.

Each touch electrode TE may have the same size as one subpixel SP or have a size corresponding to one subpixel SP. Alternatively, each touch electrode TE may have a larger size than the subpixel SP. In other words, each touch electrode TE may have a size corresponding to the area of two or more subpixels SP.

When each touch electrode TE is sized to be larger than the area of one subpixel SP, the number of touch electrodes TE which need to be driven for touch sensing may be reduced and, thus, touch driving and resultant touch sensing may be performed in an efficient and rapid manner.

The plurality of touch electrodes TE may be embedded in the display panel 110. In that sense, the display panel 110 may be said to embed a touch screen or touch screen panel. In other words, the display panel 110 may be an in-cell type or on-cell type touchscreen-embedded display panel 110.

Meanwhile, the touch display device 100 may operate in display mode to provide the display function and operate in touch mode to provide the touch sensing function.

In relation thereto, the plurality of touch electrodes TE, although operating as touch sensors in the periods of touch mode, may be used as display electrodes in the periods of display mode.

For example, in the display mode period, the plurality of touch electrodes TE may be operated as common electrodes CE to which common voltage Vcom is applied, among example display electrodes. The common voltage Vcom is a voltage corresponding to the pixel voltage applied to the pixel electrode PE.

Specifically, multiple touch lines TL may pass over the touch electrode TE. The touch line TL may connect to the touch electrode TE to provide touch signals to the touch circuit 150.

In other words, the touch line TL may apply the common voltage Vcom in display mode and, in touch mode, provide the touch sensing signal to the touch circuit 150.

In this case, at least one dummy line DL may be disposed between the touch lines TL.

The touch lines TL may be disposed over only the area connected with the touch electrodes TE depending on their shape or may be disposed to pass the whole area where the touch electrodes TE are formed.

One touch line TL may be connected to the touch electrode TE and may have a contact hole CH for connecting the touch line TL with the touch electrode TE. A plurality of contact holes CH may be formed to enhance the efficiency of connection, but without limitations thereto, one contact hole CH may be formed.

The touch line TL is connected via the contact hole CH in the same touch electrode TE, and a brightness deviation occurs due to a voltage difference between the touch area TA where the touch driving signal is applied and the dummy area DA where no touch driving signal is applied.

Figure 2:
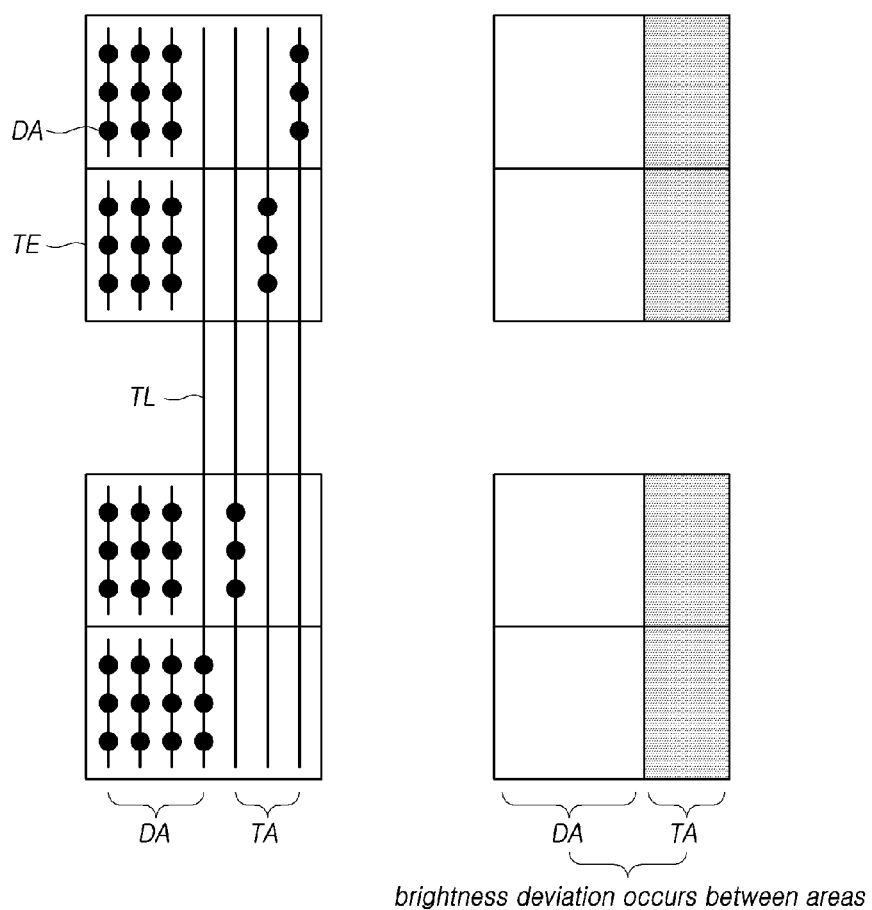
FIG. 2 is a view illustrating an occasion of a brightness deviation between a dummy area and a touch area in a touch display device according to one embodiment.
Figure 3:
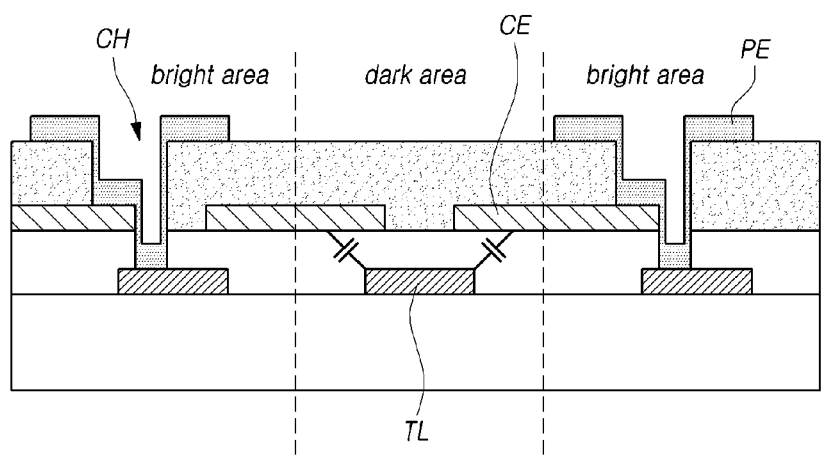
FIG. 3 is a cross-sectional view illustrating an occasion of a brightness deviation between a dummy area and a touch area in a touch display device according to one embodiment.

FIG. 2 is a view illustrating an occasion of a brightness deviation between the dummy area and the touch area in a touch display device. FIG. 3 is a cross-sectional view illustrating an occasion of a brightness deviation between the dummy area and the touch area in a touch display device.

Referring to FIGS. 2 and 3, in the dummy area DA of the touch electrode TE, the touch line TL is disconnected at the boundary of each touch electrode TE, and the touch line TL positioned in one touch electrode TE may be connected to the touch electrode TE via the contact hole CH, but no touch driving signal is applied. Or, in the dummy area DA, no touch line TL or no contact hole CH may be formed.

Thus, no capacitance is formed between the touch line TL and touch electrode TE in the dummy area DA.

In contrast, in the touch area TA, the contact hole CH is formed only in one touch line TL connected with the touch electrode TE while no contact hole CH is formed in other touch lines TL, and the touch driving signal is applied along the touch line TL.

As a result, in the area where no contact hole CH is formed, a capacitance is created between the touch line TL and the touch electrode TE.

Thus, voltage differences occur between the touch lines TLs of the touch area TA and dummy area DA and, as compared with the dummy area DA, the touch area TA with no contact hole CH becomes dark, causing a brightness deviation.

Such a phenomenon may also arise when the contact holes CH in the touch electrode TE are not uniformly arranged so that the touch lines TL are not uniform.

The brightness deviation may be solved or mitigated by arranging the touch lines TL and contact holes CH in order along one direction in the touch electrode TE.

Figure 4:
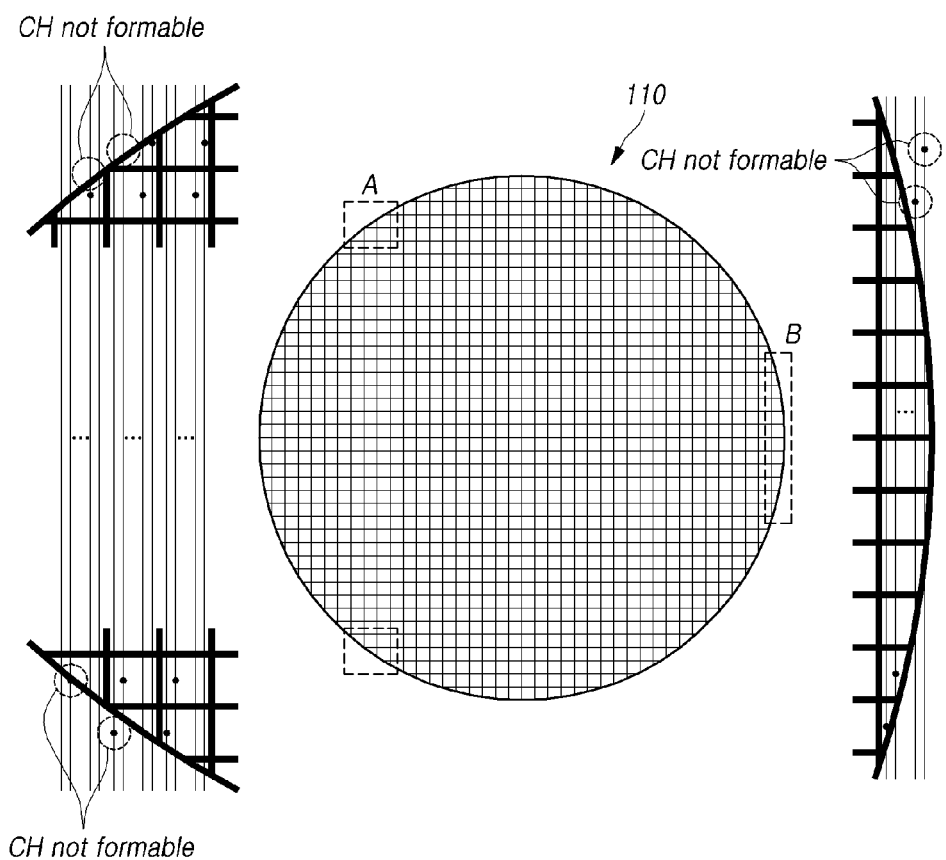
FIG. 4 is a view illustrating a structure of a touch electrode formed in an edge area of a circular display panel according to one embodiment.

However, the non-squared, e.g., circular, display panel 110 may have an area where no touch lines TL and contact holes CH may be formed in the outer area of the active area AA as shown in FIG. 4.

Figure 5:
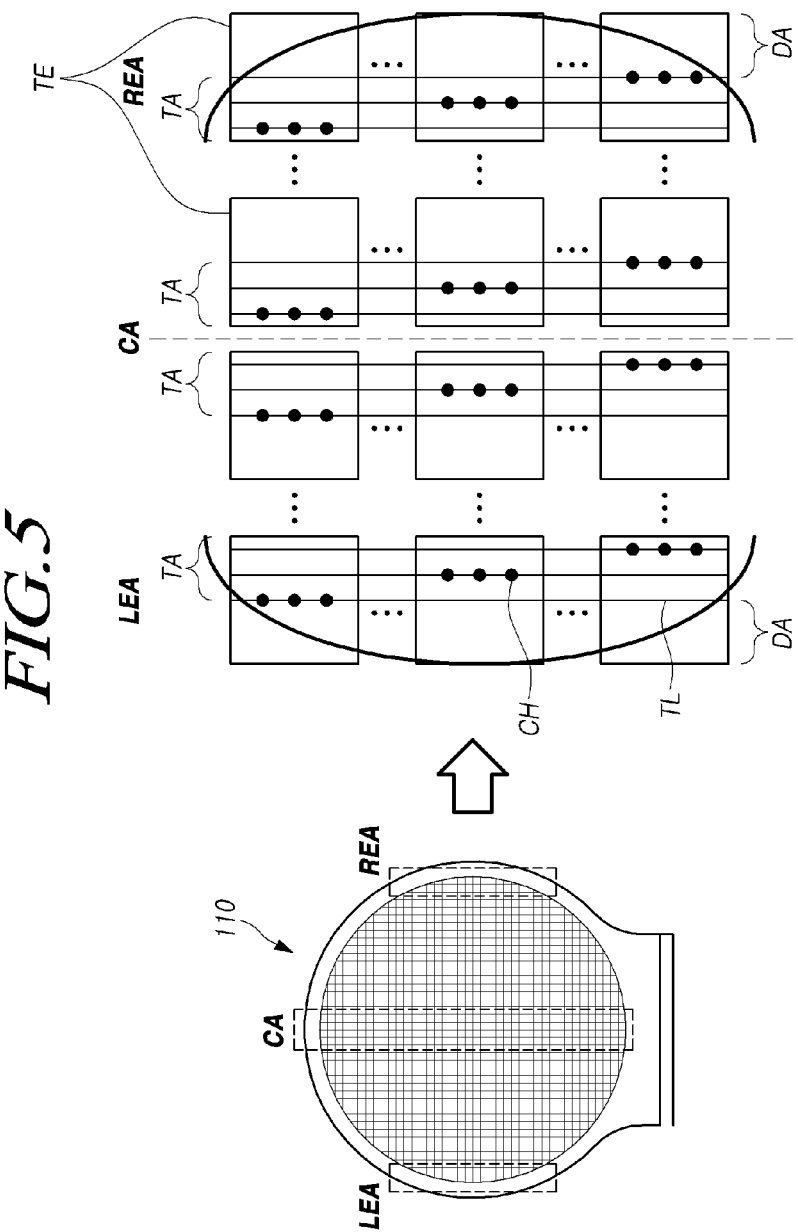
FIG. 5 is a view illustrating an example in which a contact hole is not properly formed in an edge area in a circular display panel according to one embodiment.

FIG. 5 is a view illustrating an example in which a contact hole is not properly formed in an edge area in a circular display panel.

Referring to FIG. 5, the touch electrodes TE positioned in the left edge area LEA from the middle area CA in the active area AA of the circular display panel 110 have no touch lines TL and no contact holes CH, or have a dummy area DA, where no touch driving signal is applied, in the left space. Therefore, only in the right portion of the dummy area DA, touch driving signals are applied through the touch electrodes TE and contact holes CH.

In other words, touch driving signals may be applied through the touch lines TL and contact holes CH to the touch electrodes TE positioned in the left edge area LEA of the circular display panel 110 only in the right touch area TA.

In contrast, the touch electrodes TE positioned in the right edge area REA of the middle area CA in the active area AA of the circular display panel 110 have no touch lines TL and no contact holes CH, or have no touch driving signals in the right space. Therefore, touch driving signals are applied only to the left portion through the touch electrodes TE and contact holes CH.

In other words, touch driving signals may be applied through the touch lines TL and contact holes CH to the touch electrodes TE positioned in the right edge area REA of the circular display panel 110 only in the left touch area TA.

In this case, the contact holes CH formed along the touch lines TL in the left edge area LEA and right edge area REA may be sequentially arranged from the left-top to the right-bottom.

As a result, a voltage difference may occur between the touch area TA where the touch driving signal is applied via the touch line TL and the dummy area DA where no touch driving signal is applied, causing a brightness deviation and resultantly a vertical line.

This occasion may arise not only in the circular display panel 110, but also in non-squared display panels.

Thus, since touch lines TL and contact holes CH may be non-uniformly formed in the area adjacent to the outer area of the active area AA in the circular display panel 110, it may cause a brightness deviation around the outer area of the active area AA.

Figure 6:
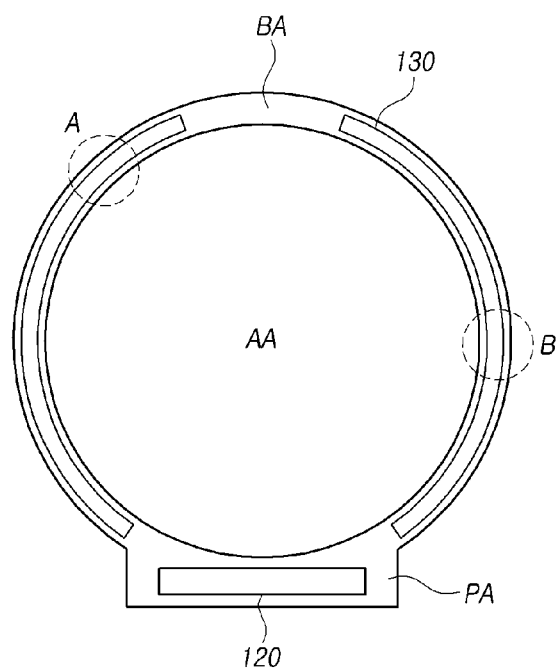
FIG. 6 is a view illustrating a structure of a circular display panel in a touch display device according to various embodiments of the disclosure.

FIG. 6 is a view illustrating a structure of a circular display panel in a touch display device according to various embodiments of the disclosure.

Referring to FIG. 6, according to various embodiments of the disclosure, when the touch display device 100 is used in, e.g., a watch, the display panel 110 may be formed in a circular or elliptical structure with a predetermined curvature.

For example, the circular display panel 110 may be implemented to have the same distance from the center of the active area AA, which displays images, to the edge.

A plurality of subpixels may be arranged in the active area AA of the circular display panel 110. A pad area PA, where the data driving circuit 120 for applying data voltages to the subpixels is positioned, may be formed on one side of the active area AA, and a bezel area BA, where signal lines are arranged, may be formed along the outer edge of the active area AA.

When the active area AA is circular, the signal lines arranged in the bezel area BA may be curved to surround the active area AA. In this case, the signal lines formed in the bezel area BA may include, e.g., driving voltage lines for supplying driving voltages to the subpixels, base voltage lines for supplying base voltages to the subpixels, a reference voltage line for supplying a reference voltage, and data lines DL for supplying data voltages.

The gate driving circuit 130 for supplying scan signals to the subpixels may be formed in the bezel area BA with a plurality of segmentation.

In the active area AA, a plurality of gate lines GL may be formed long along a first direction, e.g., the horizontal direction, and the gate lines GL may be spaced apart from each other at a predetermined interval along a second direction, e.g., the vertical direction, of the active area AA.

The gate lines GL are connected to the gate driving circuit 130 and provide scan signals from the gate driving circuit 130 to the subpixels.

In the active area AA, a plurality of data lines DL may be formed long along the second direction, e.g., the vertical direction, and the data lines DL may be spaced apart from each other at a predetermined interval along the first direction, e.g., the horizontal direction, of the active area AA.

Some of the data lines DL may extend form the data driving circuit 120 directly to the active area AA, and others may extend to the sides along the bezel area BA, providing data voltages to the subpixels.

Thus, in the active area AA, the plurality of gate lines GL and the plurality of data lines DL are arranged in a matrix pattern to cross each other, and subpixels are formed at the crossings of the gate lines GL and the data lines DL.

In the pad area PA, a plurality of strip-shaped metal pads may be formed towards the active area AA and be arranged in rows along the circumferential direction of the active area AA. In the pad area PA, the data driving circuit 120 may be formed to provide, e.g., data voltages to the data lines DL.

The data driving circuit 120 may be implemented in a chip-on-film (COF) scheme.

In the data driving circuit 120 implemented in the COF scheme, a data driver circuit chip may be mounted on a film, and metal strip pads may be formed on two opposite sides of the film to be electrically connected with the data driver circuit chip.

The bezel area BA in which the gate driving circuit 130 and the gate lines GL are arranged is formed along the outer area of the active area AA and, expands in a circular shape along with the active area AA.

The touch electrodes TE arranged adjacent to the outer area of the active area AA may not have a squared shape in their outer area due to the circular shape of the circular display panel 110.

Thus, the brightness deviation may be mitigated by arranging the contact holes CH uniformly or symmetrically, in the edge area of the active area AA of the non-squared display panel 110.

Figure 7:
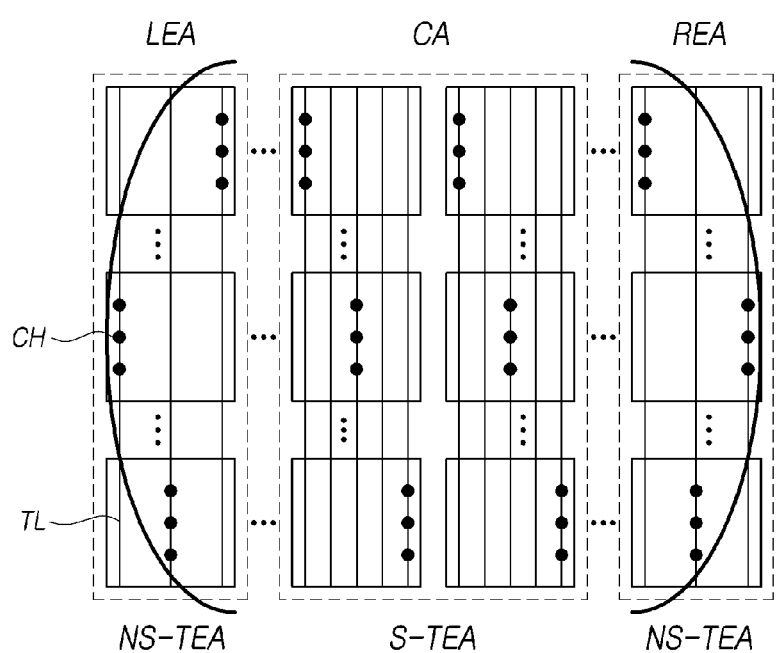
FIG. 7 is a view illustrating an arrangement of touch lines and contact holes in a display panel in a touch display device according to various embodiments of the disclosure.

FIG. 7 is a view illustrating an arrangement of touch lines and contact holes in a display panel in a touch display device according to various embodiments of the disclosure.

Referring to FIG. 7, according to various embodiments of the disclosure, in the touch display device 100, the display panel 110 may be divided into non-squared touch electrode areas NS-TEA where non-squared touch electrodes TE are formed along the extending direction of the touch lines TL and a squared touch electrode area S-TEA where squared touch electrodes TE are formed.

For example, when a touch circuit 150 is positioned at lower side of the display panel 110, the touch lines TL may extend from the bottom to top of the display panel 110 and, when the touch circuit 150 is positioned at upper side of the display panel 110, the touch lines TL may extend from the top to bottom of the display panel 110. In other words, when the touch circuit 150 is positioned upper or lower side of the display panel 110, the touch lines TL extend in the vertical direction, and the contact holes CH connected with the touch lines TL in the touch electrodes TE are also formed along the vertical direction.

As such, when the touch lines TL extend in the vertical direction, the non-squared touch electrode areas NS-TEA may be positioned at the left edge area LEA and right edge area REA where the outer area of the active area AA continues in the vertical direction parallel with the touch lines TL.

In this case, the touch electrodes TE included in the non-squared touch electrode areas NS-TEA may include a row of touch electrodes TE on the outermost edge (left or right) in the vertical direction parallel with the touch lines TL, or two or more rows of touch electrodes TE may be formed.

In contrast, the touch electrodes TE in the center, where contact holes CH in the vertical direction may normally be formed along the touch lines TL except for the non-squared touch electrode areas NS-TEA, may be positioned at the squared touch electrode area S-TEA.

However, the squared touch electrode area S-TEA may mean a squared area where all of the touch electrodes therein need not be squared electrodes and a larger number of squared touch electrodes TE, relatively to those in the non-squared touch electrode areas NS-TEA, are positioned closer to the center than those in the non-squared touch electrode areas NS-TEA.

Thus, non-squared touch electrode area NS-TEA may be referred to as an outer touch electrode area, and squared touch electrode area S-TEA may be referred to as a center touch electrode area.

For example, when 40 touch electrode TE blocks are formed in the squared touch electrode area S-TEA along the vertical direction, 40 touch lines TL may be arranged per row and, when three contact holes CH are formed in each touch line TL, 120 contact holes CH may be arranged along the vertical direction.

In contrast, since in the non-squared touch electrode areas NS-TEA, touch electrodes TE are arranged along the vertical direction in the outermost left edge area LEA or right edge area REA, the non-squared touch electrode areas NS-TEA may have a smaller number of touch electrodes TE than the squared touch electrode area S-TEA.

For example, when 12 touch electrodes TE are included along the vertical direction in the left non-squared touch electrode area NS-TEA, 12 touch lines TL may be arranged at uniform intervals in the non-squared touch electrode area NS-TEA.

In this case, the number of the contact holes CH contacting the touch electrodes TE via the touch lines TL, like those in the squared touch electrode area S-TEA, may be three. Thus, since the contact holes CH formed in the left non-squared touch electrode area NS-TEA include three contact holes CH per touch line TL, for 12 touch lines TL, 36 contact holes CH may be formed.

Here, contact holes CH are first placed at the outermost edge of the touch electrode TE where contact holes CH may be formed at the outermost edge in the left direction in the left non-squared touch electrode area NS-TEA, e.g., at the outermost edge of the touch electrode TE disposed at the leftmost side in the center area of the circular display panel 110.

Then, contact holes CH are uniformly arranged, to the right of the outermost contact holes CH, in the touch electrodes TE positioned in the left non-squared touch electrode area NS-TEA.

For example, in the circular display panel 110, the outermost contact holes CH may be arranged in the touch electrode TE in the center area of the left non-squared touch electrode area NS-TEA and, then, contact holes CH may alternately be arranged in the right-upper direction or the right-lower direction.

When the contact holes CH are arranged in such a way, the contact holes CH are arranged on the leftmost touch line TL in the middle touch electrode TE at the left non-squared touch electrode area NS-TEA, on the rightmost touch line TL in the uppermost touch electrode TE, and on the middle touch line TL in the lowermost touch electrode TE. In the illustrated example, since it is assumed that three touch lines TL are arranged along the vertical direction in the left non-squared touch electrode area NS-TEA, the position of the contact holes CH which are arranged from the outermost contact hole CH to the right-upper direction or right-lower direction may be varied depending on the number of touch lines TL.

Such an arrangement of the contact holes CH may also apply to the right non-squared touch electrode area NS-TEA formed in the right edge area REA.

For example, in the circular display panel 110, the outermost contact holes CH may be arranged in the touch electrode TE of the right center area in the right non-squared touch electrode area NS-TEA and, then, contact holes CH may alternately be arranged in the left-upper direction or left-lower direction.

Thus, the arrangement of touch lines TL and contact holes CH in the left non-squared touch electrode area NS-TEA may be symmetrical with the arrangement of touch lines TL and contact holes CH in the right non-squared touch electrode area NS-TEA.

In the squared touch electrode area S-TEA, contact holes CH may sequentially be arranged along a diagonal direction from a first position (e.g., a left-upper position) to a second position (e.g., a right-lower position).

Alternatively, the squared touch electrode area S-TEA may be divided into a left portion and a right portion. In the left portion of the squared touch electrode area S-TEA, contact holes CH may be formed in the same pattern as the left non-squared touch electrode area NS-TEA and, in the right portion of the squared touch electrode area S-TEA, contact holes CH may be formed in the same pattern as the right non-squared touch electrode area NS-TEA.

In other words, in the left portion of the squared touch electrode area S-TEA, the outermost contact holes CH may be arranged in the middle-left touch electrode TE and, then, contact holes CH may alternately be arranged in the right-upper and right-lower directions. In the right portion of the squared touch electrode area S-TEA, the outermost contact holes CH may be arranged in the middle-right touch electrode TE and, then, contact holes CH may alternately be arranged in the left-upper and left-lower directions.

Figure 8:
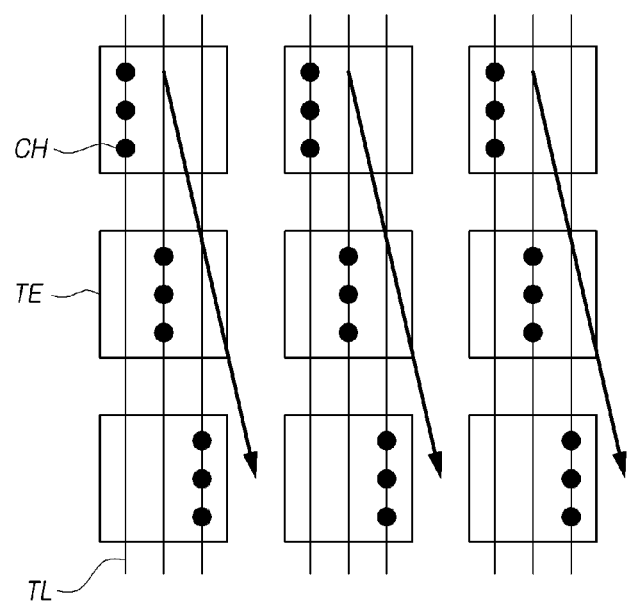
FIG. 8 is a view illustrating an example arrangement of touch lines and contact holes in a squared touch electrode area (S-TEA) in a touch display device according to an embodiment of the disclosure.

FIG. 8 is a view illustrating an example arrangement of touch lines and contact holes in a squared touch electrode area (S-TEA) in a touch display device according to an embodiment of the disclosure.

Referring to FIG. 8, according to various embodiments of the disclosure, in the touch display device 100, touch lines TL and contact holes CH may be formed at uniform intervals in touch electrodes TE in the squared touch electrode area S-TEA.

In this case, to solve the brightness deviation between the touch lines TL, the touch lines TL may be uniformly arranged, and the contact holes CH may sequentially be formed from upper to lower direction (or from lower to upper direction).

In other words, three touch lines TL are arranged at uniform intervals in each touch electrode TL, and the uppermost touch electrodes TE in the vertical direction connect to their respective leftmost touch lines TL via the contact holes CH. Then, the second touch electrodes TE along the vertical direction connect to their respective second leftmost touch lines TL via the contact holes CH, and the third touch electrodes TE along the vertical direction connect to the respective rightmost touch lines TL via the contact holes CH.

Such an arrangement of touch lines TL and contact holes CH may be sequentially arranging the contact holes CH from a left-upper to right-lower direction.

However, uniform arrangement of the touch lines TL and contact holes CH is not limited to the left-upper to right-lower direction, but various modifications may rather be made thereto, such as right-lower to left-upper, right-upper to left-lower, or left-lower to right-upper directions.

However, all such arrangements may be regarded as sequentially bringing the touch lines TL in contact with the touch electrodes TE along one direction.

As such, uniform arrangement of touch lines TL and contact holes CH is applicable to the display panel 110 of the squared touch electrode area S-TEA except the non-squared touch electrode areas NS-TEA in the non-squared touch display device 100.

Meanwhile, since a brightness deviation may occur inside the display panel 110 when the number of touch lines TL passing over one touch electrode TE in the non-squared touch electrode area differs from the number of touch lines TL passing over one touch electrode TE in the squared touch electrode area S-TEA, dummy touch lines may be formed in the non-squared touch electrode areas NS-TEA, allowing for uniform arrangement of the touch lines TL all over the entire area of the display panel 110.

Figure 9:
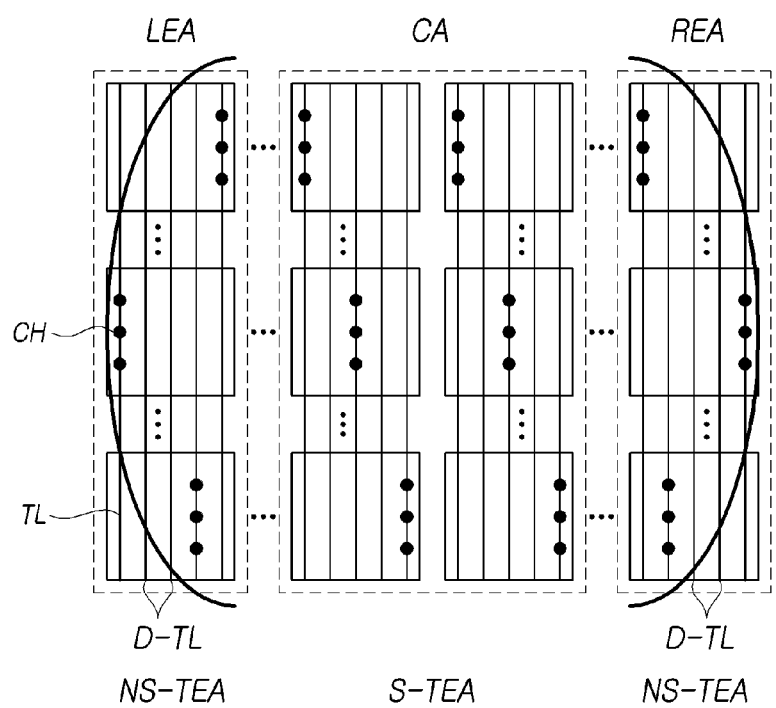
FIG. 9 is a view illustrating an arrangement of touch lines and contact holes in a display panel in a touch display device according to another embodiment of the disclosure.

FIG. 9 is a view illustrating an arrangement of touch lines and contact holes in a display panel in a touch display device according to another embodiment of the disclosure.

Referring to FIG. 9, according to another embodiment of the disclosure, in the squared touch electrode area S-TEA in the circular display panel 110 of the touch display device 100, contact holes CH may sequentially be arranged along a diagonal direction from a first position (e.g., a left-upper position) to a second position (e.g., a right-lower position).

In the left non-squared touch electrode area NS-TEA, the outermost contact holes CH may be arranged in the middle-left touch electrode TE and then, other contact holes CH may alternately be arranged in the right-upper and right-lower directions.

In the right non-squared touch electrode area NS-TEA, the outermost contact holes CH may be arranged in the middle-right touch electrode TE and then, other contact holes CH may alternately be arranged in the left-upper and left-lower directions.

Since the number of touch electrodes TE arranged in each non-squared touch electrode area NS-TEA is smaller than the number of touch electrodes TE arranged in the squared touch electrode area S-TEA, the same number of dummy touch lines D-TL as the number of touch lines TL arranged in the squared touch electrode area S-TEA may be added in the non-squared touch electrode area NS-TEA when arranging the touch lines TL corresponding to the number of touch electrodes TE arranged in the non-squared touch electrode area NS-TEA.

The dummy touch lines D-TL arranged in the non-squared touch electrode area NS-TEA are supplied no touch driving signals and may have no contact holes CH.

In this case, the dummy touch lines D-TL may be arranged densely along a predetermined direction or uniformly between the touch lines TL supplied touch driving signals.

Figure 10:
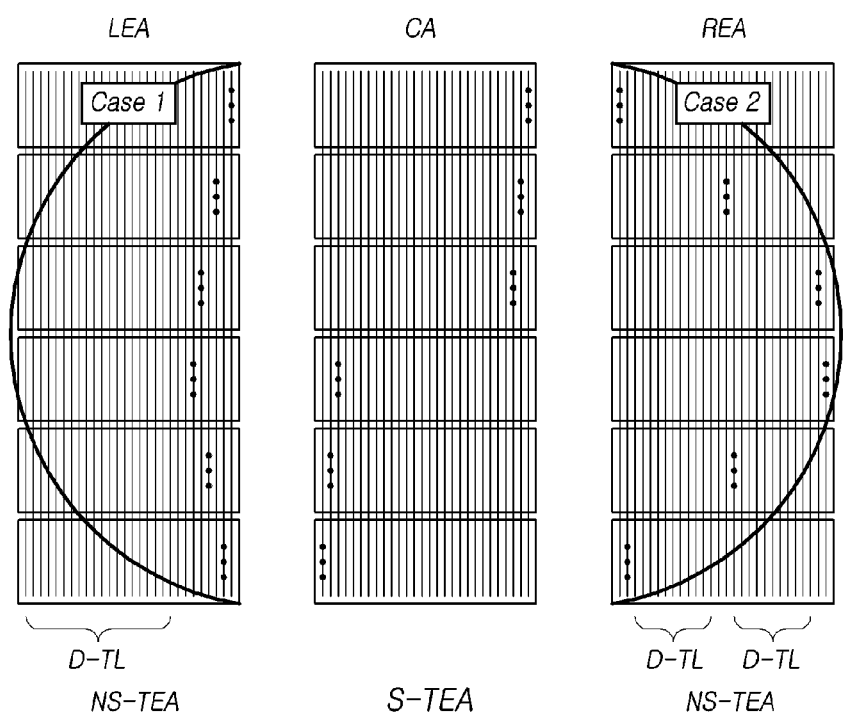
FIG. 10 is a view illustrating an example in which a dummy touch line is disposed in a non-squared touch electrode area in a touch display device according to another embodiment of the disclosure.

FIG. 10 is a view illustrating an example in which a dummy touch line is disposed in a non-squared touch electrode area in a touch display device according to another embodiment of the disclosure.

Referring to FIG. 10, according to another embodiment of the disclosure, in the squared touch electrode area S-TEA in the circular display panel 110 of the touch display device 100, contact holes CH may sequentially be arranged along a diagonal direction from a first position (e.g., a right-upper position) to a second position (e.g., a left-lower position).

In the left non-squared touch electrode area NS-TEA, the outermost contact holes CH may be arranged in the middle-left touch electrode TE and then, other contact holes CH may alternately be arranged in the right-upper and right-lower directions. In the right non-squared touch electrode area NS-TEA, the outermost contact holes CH may be arranged in the middle-right touch electrode TE and then, other contact holes CH may alternately be arranged in the left-upper and left-lower directions.

In this case, the same number of dummy touch lines D-TL with no contact hole as the number of touch lines TL arranged in the squared touch electrode area S-TEA may be further arranged in each non-squared touch electrode area NS-TEA.

Case 1 denotes an example in which the dummy touch lines D-TL are arranged densely to the left in the left non-squared touch electrode area NS-TEA, and case 2 denotes an example in which the dummy touch lines D-TL are uniformly arranged between the touch lines TL supplied touch driving signals. Since case 1 and case 2 show different arrangements of dummy touch lines D-TL, they may be independently implemented in different non-squared display panels 110. For example, in a certain non-squared display panel 110, a structure of the contact hole CH like case 1 may be applied to the left side of the display panel 110, and its symmetrical structure of the contact hole CH to the right side of the display panel 110, while in another non-squared display panel 110, the structure of the contact hole CH like case 2 may be applied to the right side of the display panel 110 and its symmetrical structure of the contact hole CH to the left side of the display panel 110.

As such, the uniform arrangement of contact holes CH in the non-squared touch electrode area NS-TEA is applicable to other various non-squared display panels 110 except circular display panels.

Figure 11A:
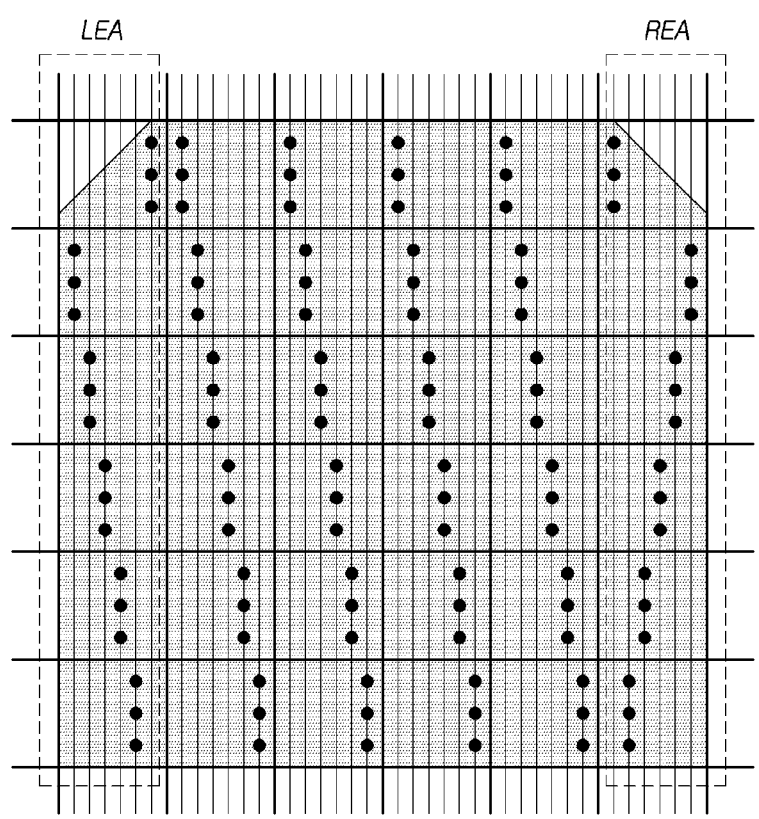
FIGS. 11A, 11B, and 11C are views illustrating various structures of non-squared display panels to which a contact hole structure according to an embodiment of the disclosure is applicable.
Figure 11B:
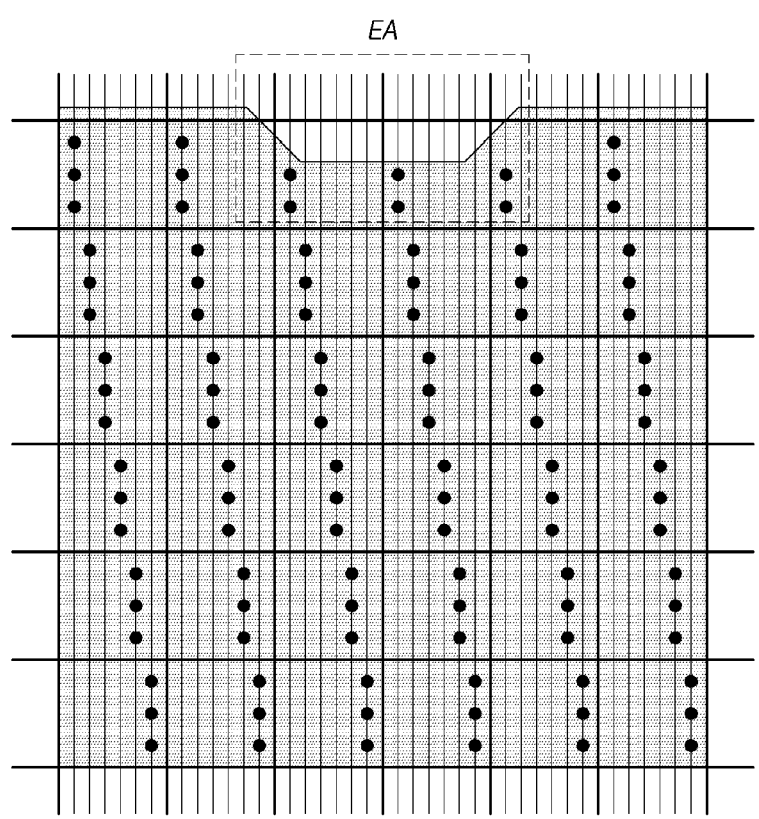
Figure 11C:
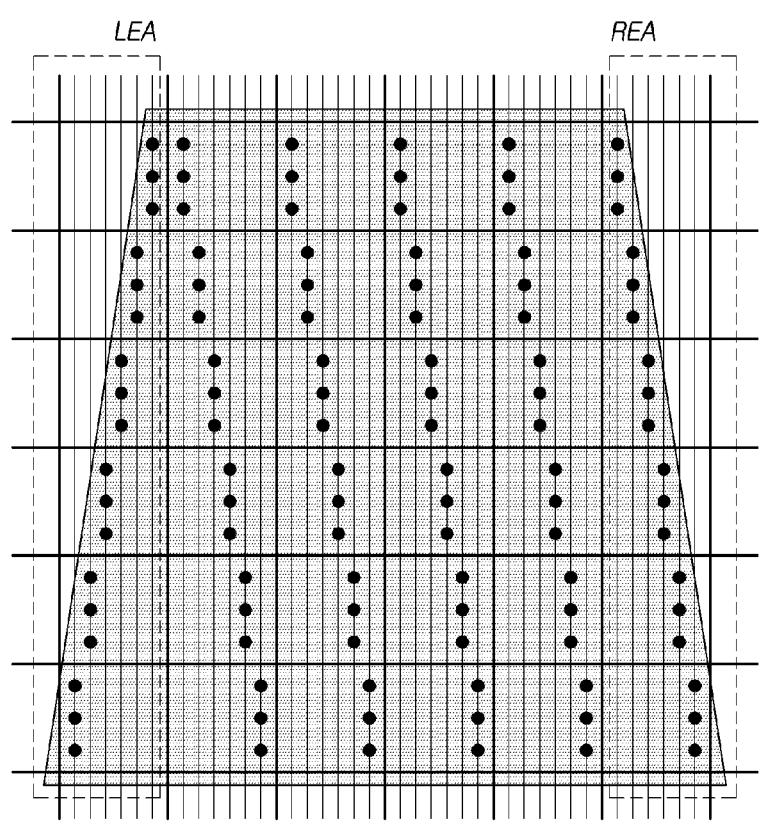

FIGS. 11A to 11C are views illustrating various structures of non-squared display panels to which a contact hole structure according to an embodiment of the disclosure is applicable.

Referring to FIG. 11, according to various embodiments of the disclosure, the non-squared display panel 110 to which the structure of the contact hole CH is applicable may be formed not only as a circular display panel but also in other various shapes in which its active area AA has some chamfered corners (as shown in FIG. 11A) or a notch (as shown in FIG. 11B), or is shaped as a trapezoid with two opposite edges cut away in the same length and angle (as shown in FIG. 11C).

In the display panel 110 with chamfered top corners as shown in FIG. 11A, the left edge area LEA and right edge area REA with the chamfered corners correspond to the non-squared touch electrode areas NS-TEA. Thus, the outermost contact holes CH are formed along the outermost area of the touch electrode TE closest to the chamfered corner and contact holes CH may alternately be formed along the upper and lower directions.

Considering the shape of the uppermost touch electrode TE, the contact holes CH may be sequentially formed along the lower direction from the outermost contact holes CH and, in the uppermost touch electrode TE, contact holes CH may be formed on the rightmost touch line TL of the non-squared touch electrode area NS-TEA.

When shaped to have a notch in the top-center edge area EA as shown in FIG. 11B, the notched top edge area EA may be set as the non-squared touch electrode area NS-TEA, and contact holes CH may be formed first in the touch electrode TE adjacent to the notched top edge EA, and contact holes CH may sequentially be formed along the lower direction.

When the display panel 110 is shaped as a trapezoid as shown in FIG. 11C, the diagonal left edge area LEA and right edge area REA may be set as the non-squared touch electrode areas NS-TEA.

In this case, contact holes CH may be formed first in the lowermost touch electrode TE, which is the outermost portion where contact holes CH may be formed, and contact holes CH may sequentially be formed along the upper direction. Since the left edge area LEA and the right edge area REA are symmetric with each other, the contact holes CH formed in the left non-squared touch electrode area NS-TEA and right non-squared touch electrode area NS-TEA may be formed symmetrically.

As such, when the active area AA of the display panel includes some circular or cut-off portion along the periphery thereof, the active area AA may be divided into the squared touch electrode area S-TEA, in which the touch electrodes TE are squared, and the non-squared touch electrode area NS-TEA, where the touch electrodes TE are not squared. In the non-squared touch electrode area NS-TEA, the outermost contact holes CH are formed first in the touch electrode TE where contact holes CH may be formed in the outermost part thereof, and contact holes CH may then be uniformly or symmetrically arranged in the touch electrodes TE towards the center from the outermost contact holes CH.

Such uniform or symmetrical arrangement of the touch lines TL and contact holes CH in the non-squared touch electrode (TE) area, considering the shape of the display panel 110 or the active area AA, may solve the brightness failure.

In the non-squared display panel 110, the outermost touch electrodes TE may be rendered too small to have contact holes CH formed therein, due to the contour of the display panel 110.

Such a touch electrode TE incapable of having contact holes CH may be electrically connected with its adjacent touch electrode TE having contact holes CH, thereby forming an integrated touch electrode.

Figure 12:
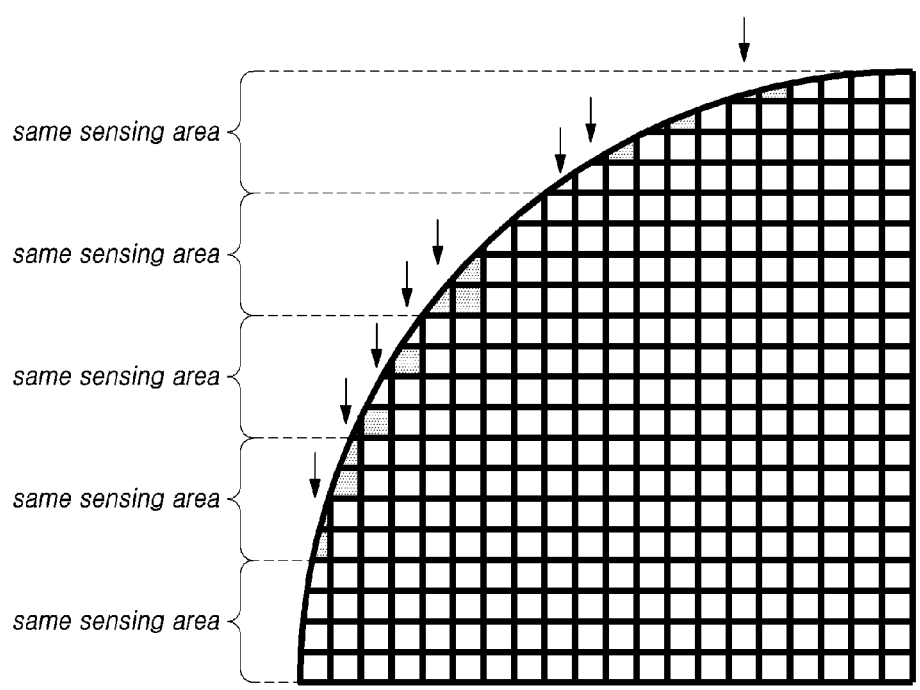
FIG. 12 is a view illustrating an example in which some touch electrodes are integrated in an edge of a touch display device according to another embodiment of the disclosure.

FIG. 12 is a view illustrating an example in which some touch electrodes are integrated in an edge of a touch display device according to another embodiment of the disclosure.

Referring to FIG. 12, according to another embodiment of the disclosure, in the non-squared display panel 110 of the touch display device 100, the outermost touch electrodes TE may be rendered too small to have contact holes CH formed therein, due to the contour of the display panel 100.

Such a touch electrode TE incapable of having contact holes CH may be electrically connected with its adjacent touch electrode TE formed in the same sensing area, which has been divided into based on a predetermined criterion, thereby forming an integrated touch electrode.

The area expanded as the integrated touch electrode is formed operates as one touch sensing area, enabling touch sensing in the same manner.

In the described example, the touch circuit 150 is positioned on the upper or lower side of the display panel 110, and the touch lines TL extend in the vertical direction. However, even when the touch circuit 150 may be positioned on the left or right side of the display panel 110, and the touch lines TL extend in the horizontal direction, the touch lines TL and contact holes CH may be arranged considering the technical features of the disclosure.

Although the circular display panel 110 has been described as an example, embodiments of the disclosure may also be applicable to other various non-squared display panels, such as those with chamfered corners, a notch, or shaped as a trapezoid.

It should also be noted that embodiments of the disclosure are applicable to both self-emissive displays, e.g., organic light emitting display (OLED), and non-self emissive displays including liquid crystal display (LCD) which require a light source.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A touch display device, comprising:
 a display panel including a plurality of subpixels displaying an image and a plurality of touch electrodes performing touch sensing;
 a gate driving circuit driving a plurality of gate lines connected with the plurality of subpixels;
 a data driving circuit driving a plurality of data lines connected with the plurality of subpixels; and
 a touch circuit driving a plurality of touch lines connected with the plurality of touch electrodes, wherein the display panel includes:
  an outer touch electrode area having at least one or more non-squared touch electrodes, in which at least one or more of outermost contact holes are arranged on an outermost touch line from the plurality of touch lines, and
  a plurality of contact holes are uniformly or symmetrically arranged from the outermost contact holes to a middle of the display panel; and
  a middle touch electrode area,
  wherein the outer touch electrode area includes, in addition to the plurality of touch lines, dummy touch lines to have a same total number of dummy touch lines and the plurality of touch lines in the outer touch electrode area as a total number of touch lines arranged in a first row of the middle touch electrode area.

2. The touch display device of claim 1, wherein the display panel includes at least one or more of a circular display panel, a chamfered display panel, a notched display panel, or a trapezoidal display panel.

3. The touch display device of claim 1, wherein the outer touch electrode area includes one or more outermost rows of touch electrodes along a direction parallel with the plurality of touch lines.

4. The touch display device of claim 1, wherein the outermost contact hole is disposed at an outermost portion of a touch electrode positioned in a middle of the outer touch electrode area.

5. The touch display device of claim 1, wherein in the outer touch electrode area, the plurality of contact holes are alternately arranged in an upper direction or a lower direction from the outermost contact hole to the middle of the display panel.

6. The touch display device of claim 1, wherein a number of touch lines arranged in the outer touch electrode area is identical to a number of touch electrodes arranged in the outer touch electrode area.

7. The touch display device of claim 1, wherein the dummy touch lines are arranged densely at a side of the outer touch electrode area.

8. The touch display device of claim 1, wherein the dummy touch lines are uniformly arranged between the plurality of touch lines in the outer touch electrode area.

9. The touch display device of claim 1, wherein in a left portion of the middle touch electrode area, contact holes are arranged in a same pattern as the outer touch electrode area which is positioned on a left side of the middle touch electrode area.

10. The touch display device of claim 1, wherein in a left portion of the middle touch electrode area, the outermost contact hole is disposed in a middle-left touch electrode, and the plurality of contact holes are alternately arranged in a right-upper direction and a right-lower direction.

11. The touch display device of claim 1, wherein in a right portion of the middle touch electrode area, contact holes are arranged in a same pattern as the outer touch electrode area which is positioned on a right side of the middle touch electrode area.

12. The touch display device of claim 1, wherein in a right portion of the middle touch electrode area, the outermost contact hole is disposed in a middle-right touch electrode, and the plurality of contact holes are alternately arranged in a left-upper direction and a left-lower direction.

13. The touch display device of claim 1, wherein a touch electrode incapable of having a contact hole formed in the outer touch electrode area is electrically connected with an adjacent touch electrode having a contact hole formed in a same sensing area with a predetermined size.

14. A touch display device, comprising:
a display panel including a plurality of touch electrodes; and
a touch circuit driving a plurality of touch lines connected with the plurality of touch electrodes, wherein the display panel includes:
outer touch electrodes having first touch electrodes at a first side of the display panel and second touch electrodes at a second side of the display panel that is opposite the first side, and
middle touch electrodes located between the first touch electrodes and the second touch electrodes,
wherein at least one touch electrode of the first touch electrodes has a different shape from a touch electrode of the middle touch electrodes, and at least one touch electrode of the second touch electrodes has different shape from the touch electrode of the middle touch electrodes,
wherein each of the outer touch electrodes is electrically connected to a corresponding touch line of the plurality of touch lines via corresponding first contact holes,
wherein each of the middle touch electrodes is electrically connected to a corresponding touch line of the plurality of touch lines via corresponding second contact holes,
wherein the second contact holes corresponding to the middle touch electrodes are asymmetrically arranged with respect to a center of the display panel, and
wherein the first contact holes corresponding to the outer touch electrodes are symmetrically arranged with respect to the center of the display panel.

15. The touch display device of claim 14, wherein a first touch electrode of the first touch electrodes is electrically connected to a first touch line from the plurality of touch lines via first contact holes, and a second touch electrode of the first touch electrodes is electrically connected to a second touch line from the plurality of touch lines via second contact holes,
wherein a third touch electrode of the second touch electrodes is electrically connected to a third touch line from the plurality of touch lines via third contact holes, and a fourth touch electrode of the second touch electrodes is electrically connected to a fourth touch line from the plurality of touch lines via a fourth contact holes,
wherein a fifth touch electrode of the middle touch electrodes is electrically connected to a fifth touch line from the plurality of touch lines via fifth contact holes, and a sixth touch electrode of the middle touch electrodes is electrically connected to a sixth touch line via sixth contact holes,
wherein a seventh touch electrode of the middle touch electrodes is electrically connected to a seventh touch line via seventh contact holes, and an eighth touch electrode of the middle touch electrodes is electrically connected to an eighth touch line via eighth contact holes.

16. The touch display device of claim 15, wherein a distance between the fifth contact holes and the seventh contact holes is the same as a distance between the sixth contact holes and the eighth contact holes, and
wherein a distance between the first contact holes and the third contact holes is different from a distance between the second contact holes and the fourth contact holes.

17. The touch display device of claim 15, wherein the first touch electrode, the third touch electrode, the fifth touch electrode, and the seventh touch electrode are arranged in a first row of touch electrodes, and
wherein the second touch electrode, the fourth touch electrode, the sixth touch electrode, and the eighth touch electrode are arranged in a second row of touch electrodes.

18. The touch display device of claim 14, wherein the display panel further includes dummy touch lines, wherein the first touch electrodes overlap with corresponding first dummy touch lines and the second touch electrodes overlaps with corresponding second dummy touch lines.

19. The touch display device of claim 14, wherein in the middle touch electrodes, a distance between a side edge of a first middle electrode of the middle touch electrodes and corresponding contact holes corresponding to the first middle electrode is different from a distance between a side edge of a second middle electrode of the middle touch electrodes and corresponding contact holes corresponding to the second middle electrode.

20. The touch display device of claim 14, wherein the at least one touch electrode of the first touch electrodes or the at least one touch electrode from the second touch electrodes has a first size, wherein another touch electrode of the middle touch electrodes has a second size that is different from the first size.

* * * * *